(12) United States Patent
Ben Henda et al.

(10) Patent No.: US 12,192,835 B2
(45) Date of Patent: Jan. 7, 2025

(54) PRIVACY IN A WIRELESS COMMUNICATION NETWORK

(71) Applicant: Telefonaktiebolaget LM Ericsson (publ), Stockholm (SE)

(72) Inventors: Noamen Ben Henda, Vällingby (SE); Peter Hedman, Helsingborg (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/766,359

(22) PCT Filed: Oct. 1, 2020

(86) PCT No.: PCT/EP2020/077490
§ 371 (c)(1),
(2) Date: Apr. 4, 2022

(87) PCT Pub. No.: WO2021/064091
PCT Pub. Date: Apr. 8, 2021

(65) Prior Publication Data
US 2024/0107389 A1    Mar. 28, 2024

Related U.S. Application Data

(60) Provisional application No. 62/910,992, filed on Oct. 4, 2019.

(51) Int. Cl.
*H04W 36/00* (2009.01)
*H04W 12/06* (2021.01)
(Continued)

(52) U.S. Cl.
CPC ....... *H04W 36/0061* (2013.01); *H04W 12/06* (2013.01); *H04W 12/08* (2013.01); *H04W 36/08* (2013.01)

(58) Field of Classification Search
CPC . H04W 12/06; H04W 12/08; H04W 36/0061; H04W 36/08; H04W 48/02; H04W 84/045
See application file for complete search history.

(56) References Cited

U.S. PATENT DOCUMENTS 8,520,636 B2    8/2013  Xu
2020/0162919 A1*  5/2020  Velev ................. H04L 63/0892
(Continued)

OTHER PUBLICATIONS

3GPP, "3GPP TS 23.501 V16.2.0", 3rd Generation Partnership Project; Technical Specification Group Services and System Aspects; System Architecture for the 5G System (5GS); Stage 2 (Release 16), Sep. 2019, 1-391.
(Continued)

*Primary Examiner* — Siu M Lee
(74) *Attorney, Agent, or Firm* — Murphy, Bilak & Homiller, PLLC

(57) ABSTRACT

A method performed by a wireless device (12). The method comprises performing, over a first cell (14) associated with a public network, a non-access stratum (NAS) procedure in which the wireless device (12) is authenticated as being authorized to access a non-public network. The method also comprises after performing the NAS procedure, receiving from the first cell (14) a mobility command that commands the wireless device (12) to perform a mobility procedure towards a second cell (16) associated with the non-public network.

19 Claims, 18 Drawing Sheets

(51) Int. Cl.
  *H04W 12/08* (2021.01)
  *H04W 36/08* (2009.01)

(56) References Cited

U.S. PATENT DOCUMENTS

| | | | |
|---|---|---|---|
| 2020/0280854 A1* | 9/2020 | Kunz | H04W 12/0431 |
| 2021/0051477 A1* | 2/2021 | Suh | H04W 60/00 |
| 2021/0184875 A1* | 6/2021 | Qiao | H04M 15/66 |
| 2022/0312299 A1* | 9/2022 | Mochizuki | H04W 48/10 |
| 2022/0377548 A1* | 11/2022 | Rajadurai | H04W 12/08 |

OTHER PUBLICATIONS

3GPP, "3GPP TR 33.819 V1.1.0", 3rd Generation Partnership Project; Technical Specification Group Services and System Aspects; Study on security for 5GS enhanced support of Vertical and LAN Services; (Release 16), Jun. 2019, 1-31.

3GPP, "3GPP TR 33.819 V1.2.0", 3rd Generation Partnership Project; Technical Specification Group Services and System Aspects; Study on security for 5GS enhanced support of Vertical and LAN Services; (Release 16), Sep. 2019, 1-42.

3GPP, "3GPP TS 33.501 V16.0.0", 3rd Generation Partnership Project; Technical Specification Group Services and System Aspects; Security architecture and procedures for 5G system (Release 16), Sep. 2019, 1-196.

3GPP, "3rd Generation Partnership Project; Technical Specification Group Services and System Aspects; Security architecture and procedures for 5G system (Release 15)", 3GPP TS 33.501 V15.5.0, Jun. 2019, 1-190.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

\* cited by examiner

PRIVACY IN A WIRELESS COMMUNICATION NETWORK

TECHNICAL FIELD

The present application relates generally to a wireless communication network, and relates more specifically to privacy in such a network.

BACKGROUND

A wireless communication network provides wireless access to wireless devices via one or more cells that provide coverage over respective areas. The network to which a cell provides access (i.e., the network to which the cell is associated) may be a public network or a non-public network. A non-public network (NPN) is a network that is intended for non-public use. An NPN may for instance be intended for the sole use of a private entity such as an enterprise. Regardless, an NPN may be a standalone NPN (SNPN) that is capable of operating without dependency on a Public Land Mobile Network (PLMN). In this case, the SNPN may be identified by a combination of a PLMN ID and a Network ID (NID). Or, an NPN may be a Public Network integrated NPN (PNiNPN) that is deployed with the support of a PLMN. In this case, for example, a PLMN may dedicate a network slice to the PNiNPN and employ the use of a Closed Access Group (CAG) for access control.

A cell heretofore transmits information (e.g., system information) that advertises with which network the cell is associated. The cell may for instance transmit a PLMN identifier (ID) that identifies a public network with which the cell is associated. Or, if the cell is associated with a standalone NPN, the cell may transmit a PLMN ID in conjunction with an NID. Or, if the cell is associated with a PNiNPN, the cell may transmit a CAG ID to indicate that the cell is associated with a certain CAG, e.g., dedicated to the PNiNPN.

Advertising the identity of the network with which a cell is associated advantageously assists wireless devices in identifying to which cell to request access. However, this creates a privacy or security threat. Indeed, a malicious eavesdropper may positively identify which cell(s) are associated with a particular network. This association may prove sensitive under some circumstances, though, such as where the network is dedicated to a Law Enforcement Agency (LEA). Challenges exist therefore in enabling a wireless device to access a cell associated with a certain network, while also concealing the cell's association with that certain network from unauthorized parties.

SUMMARY

According to some embodiments herein, a cell conceals certain information, at least from wireless devices on a radio interface. Such concealed information may indicate with which network the cell is associated and/or with which type of network the cell is associated. The cell may conceal the information by, for example, refraining from transmitting that concealed information over the air interface. The cell may for instance transmit a physical cell identity (PCI) of the cell over the air interface, but refrain from transmitting a PLMN ID, a NID, and/or a CAG ID. This may for instance advantageously ensure the privacy and security of the cell's associated with a certain network, e.g., a non-public network.

In this context, a network node (e.g., implementing an access and mobility function, AMF) according to some embodiments may effectively assist a wireless device in moving to a cell that is associated with a certain network but that conceals such association from the wireless device. The network node in this regard may control, trigger or otherwise prompt a radio network node to command the wireless device to perform a mobility procedure towards a certain cell that is associated with the certain network. The network node may for instance transmit control signaling to the radio network node which indicates a certain network that the wireless device is authorized to access, targets to access, and/or is to be moved to. The radio network node may then determine which cell is associated with that certain network, e.g., where such association is known to or obtainable by the radio network node, but not the wireless device. The radio network node may for example determine which one or more physical cell identities (PCIs) are associated with the certain network to which the wireless device targets access and/or is authorized to access. The radio network node may then transmit a mobility command to the wireless device to command the wireless device to perform a mobility procedure towards the determined cell, e.g., including the identified PCI.

According to some embodiments, then, the association of a cell with a certain network may remain concealed to any wireless devices that are not authorized to access that network. But, those wireless devices that are authorized to access the network may be moved (e.g., handed over or redirected) to a cell associated with the network.

More particularly, embodiments herein include a method performed by a wireless device. The method comprises performing, over a first cell associated with a public network, a non-access stratum, NAS, procedure in which the wireless device is authenticated as being authorized to access a non-public network. The method also comprises, after performing the NAS procedure, receiving from the first cell a mobility command that commands the wireless device to perform a mobility procedure towards a second cell associated with the non-public network.

In some embodiments, the mobility procedure is a handover procedure or a redirect procedure.

In some embodiments, the method also comprises performing the mobility procedure towards the second cell.

In some embodiments, the mobility command includes an identifier of the second cell towards which the wireless device is configured to perform the mobility procedure. In this case, the method further comprises determining, based on the mobility command, that the second cell identified by the identifier is a cell associated with the non-public network.

In some embodiments, the method also comprises transmitting, via the first cell, secured NAS signaling which indicates one or more identifiers associated with the non-public network that the wireless device targets to access. In this case, the mobility command is received responsive to transmitting the secured NAS signaling. In still other embodiments, the non-public network is a standalone non-public network, SNPN, and the one or more identifiers include a public land mobile network identity, PLMN ID, and a network identifier, NID, or the non-public network is a public network integrated non-public network, PNiNPN, and the one or more identifiers include a public land mobile network identity, PLMN ID. In still other embodiments, the one or more identifiers include a closed access group, CAG, identifier or a network slice identifier. In still other embodiments, the secured NAS signaling comprises a Registration message or a Security Mode Command, SMC, Complete message. In still other embodiments, authentication of the wireless device as being authorized to access the non-public network is based on or triggered by the secured NAS signaling.

In some embodiments, the second cell conceals from the wireless device an association of the second cell with the non-public network. In this case, the first cell advertises to the wireless device that the first cell is associated with the public network.

Embodiments herein also include a method performed by a radio network node configured to serve a first cell associated with a public network. The method comprises receiving, from a core network node, control signaling which indicates a non-public network that a wireless device is authorized to access, targets to access, and/or is to be moved to. The method also comprises determining a second cell associated with the non-public network. The method also comprises transmitting to the wireless device a mobility command that commands the wireless device to perform a mobility procedure towards the second cell.

In some embodiments, the mobility procedure is a handover procedure or a redirect procedure.

In some embodiments, the core network node implements an Access and Mobility Function, AMF.

In some embodiments, the non-public network is a stand-alone non-public network, SNPN, and the control signaling indicates the non-public network by indicating a public land mobile network identity, PLMN ID, and a network identifier, NID associated with the non-public network. Or in other embodiments, the non-public network is a public network integrated non-public network, PNiNPN, and the control signaling indicates the non-public network by indicating a closed access group, CAG, identifier, or a network slice identifier, associated with the non-public network.

In some embodiments, the control signaling further indicates information governing prioritization of one or more cells of the non-public network. In still other embodiments, the information governing prioritization of one or more cells of the non-public network includes a radio access technology, RAT, selection priority information or frequency selection priority information.

In some embodiments, the second cell conceals from the wireless device an association of the second cell with the non-public network, and the first cell advertises to the wireless device that the first cell is associated with the public network.

Embodiments herein also include a method performed by a core network node. The method comprises authenticating a wireless device as being authorized to access a non-public network. The method also comprises transmitting, from the core network node to a radio network node configured to serve a first cell associated with a public network, control signaling which indicates a non-public network that the wireless device is authorized to access, targets to access, and/or is to be moved.

In some embodiments, transmitting the control signaling is performed responsive to authenticating the wireless device.

In some embodiments, the method further comprises receiving, via the first cell associated with the public network, secured control plane signaling which indicates one or more identifiers associated with the non-public network that the wireless device targets to access. In this case, transmitting the control signaling is performed responsive to receiving the secured control plane signaling.

In some embodiments, the core network node implements an Access and Mobility Function, AMF.

In some embodiments, the non-public network is a stand-alone non-public network, SNPN, and the control signaling indicates the non-public network by indicating a public land mobile network identity, PLMN ID, and a network identifier, NID associated with the non-public network. Alternatively, the non-public network is a public network integrated non-public network, PNiNPN, and the control signaling indicates the non-public network by indicating a closed access group, CAG, identifier, or a network slice identifier, associated with the non-public network.

In some embodiments, the control signaling further indicates information governing prioritization of one or more cells of the non-public network.

In some embodiments, the information governing prioritization of one or more cells of the non-public network includes a radio access technology, RAT, selection priority information or frequency selection priority information.

In some embodiments, the second cell conceals from the wireless device an association of the second cell with the non-public network, and the first cell advertises to the wireless device that the first cell is associated with the public network.

Embodiments herein also include a wireless device. The wireless device is configured to perform, over a first cell associated with a public network, a non-access stratum, NAS, procedure in which the wireless device is authenticated as being authorized to access a non-public network. The wireless device is also configured to, after performing the NAS procedure, receive from the first cell a mobility command that commands the wireless device to perform a mobility procedure towards a second cell associated with the non-public network.

In some embodiments, the wireless device is also configured to perform the steps described above for a wireless device.

Embodiments herein also include a radio network node configured to serve a first cell associated with a public network. The radio network node is configured to receive, from a core network node, control signaling which indicates a non-public network that a wireless device is authorized to access, targets to access, and/or is to be moved to. The radio network node is also configured to determine a second cell associated with the non-public network. The radio network node is also configured to transmit to the wireless device a mobility command that commands the wireless device to perform a mobility procedure towards the second cell.

In some embodiments, the radio network node is also configured to perform the steps described above for a radio network node.

Embodiments herein also include a core network node. The core network node is configured to authenticate a wireless device as being authorized to access a non-public network. The core network node is also configured to transmit, from the core network node to a radio network node configured to serve a first cell associated with a public network, control signaling which indicates a non-public network that the wireless device is authorized to access, targets to access, and/or is to be moved.

In some embodiments, the core network node is also configured to perform the steps described above for a core network node.

Embodiments herein also include a computer program comprising instructions which, when executed by at least one processor of a wireless device, causes the wireless device to carry out the steps described above for a wireless device. Embodiments herein also include a computer program comprising instructions which, when executed by at least one processor of a radio network node, causes the radio network node to carry out the steps described above for a radio network node. Embodiments herein also include a computer program comprising instructions which, when executed by at least one processor of a core network node, causes the core network node to carry out the steps described above for a core network node. In some embodiments, a carrier containing the computer program is one of an electronic signal, optical signal, radio signal, or computer readable storage medium.

Embodiments herein also include a wireless device. The wireless device comprises communication circuitry and processing circuitry. The processing circuitry is configured to perform, over a first cell associated with a public network, a non-access stratum, NAS, procedure in which the wireless device is authenticated as being authorized to access a non-public network. The processing circuitry is also configured to, after performing the NAS procedure, receive from the first cell a mobility command that commands the wireless device to perform a mobility procedure towards a second cell associated with the non-public network.

In some embodiments, the processing circuitry is further configured to perform the steps described above for a wireless device.

Embodiments herein also include a radio network node configured to serve a first cell associated with a public network. The radio network node comprises communication circuitry and processing circuitry. The processing circuitry is configured to receive, from a core network node, control signaling which indicates a non-public network that a wireless device is authorized to access, targets to access, and/or is to be moved to. The processing circuitry is also configured to determine a second cell associated with the non-public network. The processing circuitry is also configured to transmit to the wireless device a mobility command that commands the wireless device to perform a mobility procedure towards the second cell.

In some embodiments, the processing circuitry is further configured to perform the steps described above for a radio network node.

Embodiments herein also include a core network node. The core network node comprises communication circuitry and processing circuitry. The processing circuitry is configured to authenticate a wireless device as being authorized to access a non-public network. The processing circuitry is also configured to transmit, from the core network node to a radio network node configured to serve a first cell associated with a public network, control signaling which indicates a non-public network that the wireless device is authorized to access, targets to access, and/or is to be moved.

In some embodiments, the processing circuitry is further configured to perform the steps described above for a core network node.

DETAILED DESCRIPTION

Figure 1:
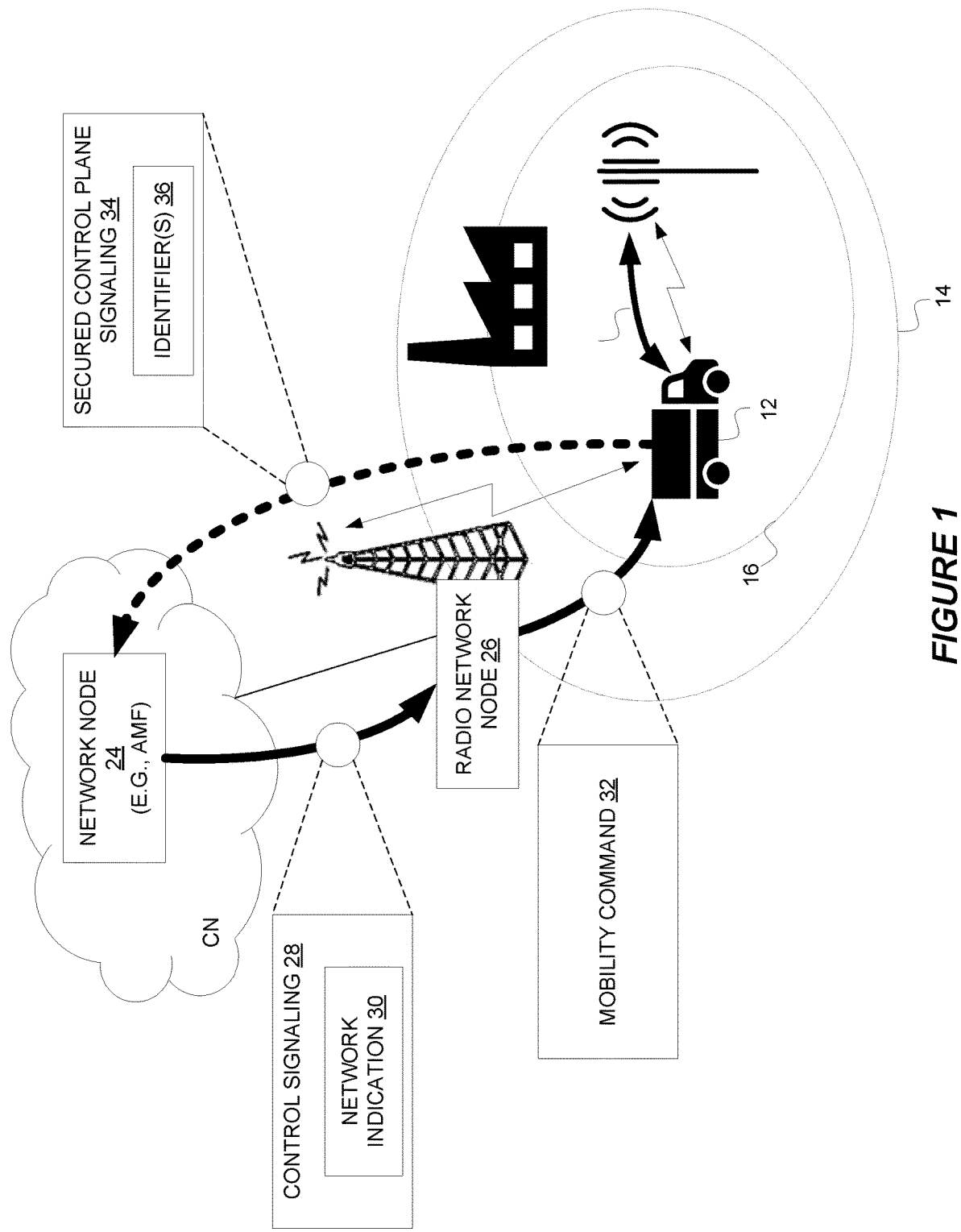
FIG. 1 is a block diagram of a wireless communication network according to some embodiments.

FIG. 1 shows a wireless device 12 according to some embodiments. The wireless device 12 may be embedded in or otherwise associated with a vehicle, as shown, or may be any type of device that is configured and/or capable of wireless communication.

The wireless device 12 as shown is capable of accessing a first cell 14 associated with a first network, e.g., a public network. In some embodiments, the first cell 14 is a so-called open cell. In these and other embodiments, the first cell 14 may advertise with which network the first cell 14 is associated, e.g., by transmitting a Public Land Mobile Network (PLMN) identity (ID) for anyone to read. The first cell 14 may for instance transmit system information in an open manner, i.e., without concealing it.

A second cell 16 by contrast may conceal certain information. The concealed information may for instance include system information for the second cell, an identifier associated with the second cell, information that indicates with which network the second cell is associated, and/or information that indicates which type of network the second cell is associated. For example, the second cell 16 may be associated with a second network but may nonetheless conceal that association. For instance, where the second cell 16 is associated with a public network, the information concealed by the second cell 16 may include a PLMN ID that identifies the PLMN with which the second cell 16 is associated. Or, where the second cell 16 is associated with a standalone non-public network (NPN), the information concealed by the second cell 16 may include a PLMN ID and Network ID (NID) combination with which the second cell 16 is associated. Or, if the second cell 16 is associated with a public network integrated NPN, information concealed by the second cell 16 may include a closed access group (CAG) identifier (CAG ID) with which the second cell 16 is associated. In one such embodiment, the second cell 16 may just advertise its physical cell identity (PCI), but nonetheless conceal its CAG ID, so as to conceal the association of the second cell 16 with that CAG ID.

Note that in some embodiments where the second cell 16 is associated with an NPN, the second cell 16 may be dedicated to providing access to that NPN, i.e., such that the second cell 16 may be referred to as a dedicated cell. Regardless, with the information concealed, the second cell 16 may also be referred to as a protected cell.

In some embodiments, the second cell 16 may conceal the information in the sense that second cell 16 makes the information unobtainable, inaccessible, and/or undecipherable to wireless devices that are not authorized to obtain, access, and/or decipher the information. In some embodiments, for example, the second cell 16 refrains from transmitting that concealed information.

In this context, a network node 24 (e.g., implementing an access and mobility function, AMF) according to some embodiments may effectively assist the wireless device 12 in moving to a cell that is associated with a certain network but that conceals such association from the wireless device 12. The network node 24 in this regard may control, trigger or otherwise prompt a radio network node 26 controlling the first cell 14 to command the wireless device 12 to perform a mobility procedure towards the second cell 16 associated with the second network. The network node 24 may for instance transmit control signaling 28 to the radio network node 26 which includes an indication 30 of the second network as being a network that the wireless device 12 is authorized to access, targets to access, and/or is to be moved to. The radio network node 26 may then determine which cell is associated with the second network, e.g., where such association is known to or obtainable by the radio network node 26, but not the wireless device 12. The radio network node 26 may for example determine which one or more physical cell identities (PCIs) are associated with the second network to which the wireless device 12 targets access and/or is authorized to access. The radio network node 26 may then transmit a mobility command 32 to the wireless device 12 to command the wireless device 12 to perform a mobility procedure towards the determined cell; namely, the second cell 16 in this example.

According to some embodiments, then, the association of the second cell 16 with the second network may remain concealed to any wireless devices that are not authorized to access that network. This advantageously mitigates any privacy or security threat that would otherwise be attributable to advertising the association of the second cell 16 with the second network. But, those wireless devices that are authorized to access the second network may be moved (e.g., handed over or redirected) to the second cell 16, i.e., a cell associated with the second network. That is, some embodiments still facilitate access to the second network via the second cell 16 by wireless devices authorized for that access, while at the same time concealing the second cell's association with the second network from wireless devices not authorized to access the second network.

Note that in some embodiments the network node 24 receives, via the first cell 14 associated with the first network, secured control plane signaling 34. This signaling 34 indicates one or more identifiers 36 associated with the second network that the wireless device 12 targets to access. Based on this control signaling 34 or based on the wireless device 12 only being configured to access the second network, the network node 24 may then determine whether the wireless device 12 is authorized to access the second network.

Upon authenticating the wireless device 12 as being authorized to access the second network, the network node 24 may proceed as described above by transmitting control singaling 28 to the radio network node 26. That is, some embodiments condition transmitting the control signaling 28 to the radio network node 26 (for moving the wireless device 12 to the second cell 16) on the wireless device 12 being authorized to access the second network.

Figure 2:
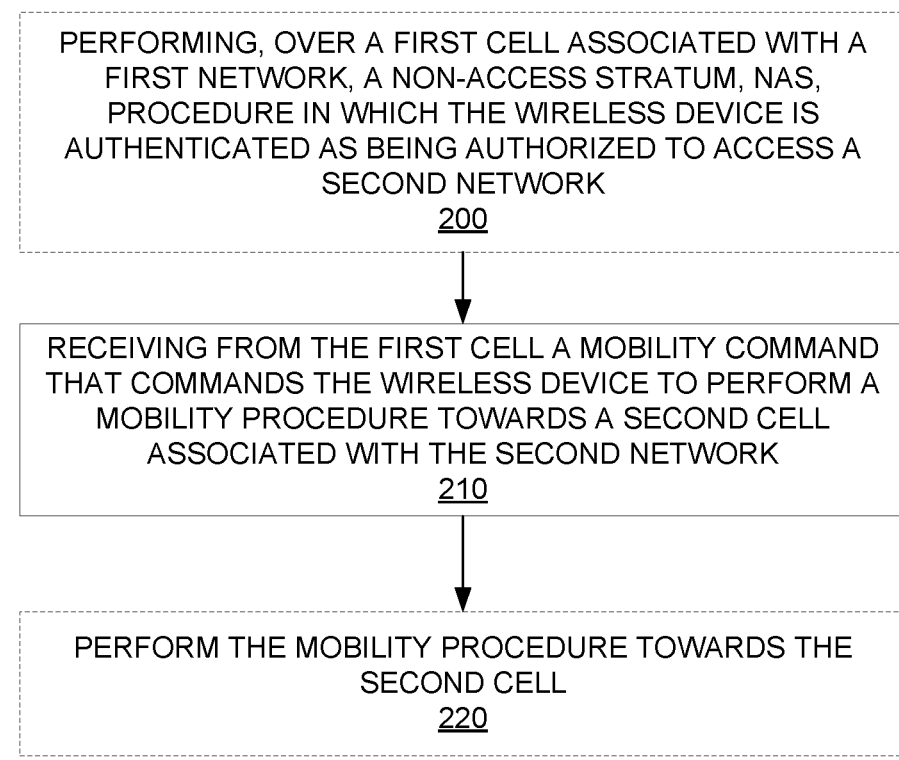
FIG. 2 is a logic flow diagram of a method performed by a wireless device according to some embodiments.

In view of the above modifications and variations, FIG. 2 depicts a method performed by a wireless device 12 in accordance with particular embodiments. The method may include performing, over a first cell 14 associated with a first network, a non-access stratum, NAS, procedure in which the wireless device is authenticated as being authorized to access a second network (Block 200).

In some embodiments, the first network is a public network. Alternatively or additionally, the second network may be a non-public network. For example, the second network may be a standalone non-public network (SNPN) or a public network integrated non-public network (PNiNPN).

In some embodiments, the method may comprise (e.g., as part of performing the NAS procedure) the wireless device 12 transmitting secured NAS signaling, e.g., in the form of a Registration message or a Security Mode Command (SMC) Complete message. The secured NAS signaling may indicate one or more identifiers associated with the second network that the wireless device 12 targets to access. Where the second network is an SNPN, for example, the one or more identifiers may include a PLMN ID and an NID. Or, where the second network is a PNiNPN, the one or more identifiers may include a PLMN ID. In any of these embodiments, the one or more identifiers may include a closed access group CAG) ID and/or a network slice identifier.

The method may alternatively or additionally include (e.g., after performing the NAS procedure and/or transmitting the NAS signaling) receiving from the first cell 14 a mobility command 32 that commands the wireless device 12 to perform a mobility procedure towards a second cell 16 associated with the second network. In some embodiments, the mobility procedure is a handover procedure or a redirect procedure. Alternatively or additionally, the mobility command 32 in some embodiments includes an identifier of the second cell 16 towards which the wireless device 12 is to perform the mobility procedure. In one or more such embodiments, the method may also comprise determining, based on the mobility command 32, that the second cell 16 identified by the identifier is a cell associated with the second network.

Regardless, in some embodiments, the method further comprises performing the mobility procedure towards the second cell 16, e.g., as commanded by the mobility command 32.

In some embodiments, the second cell 16 is a cell which conceals an association of the second cell 16 with the second network.

Figure 3:
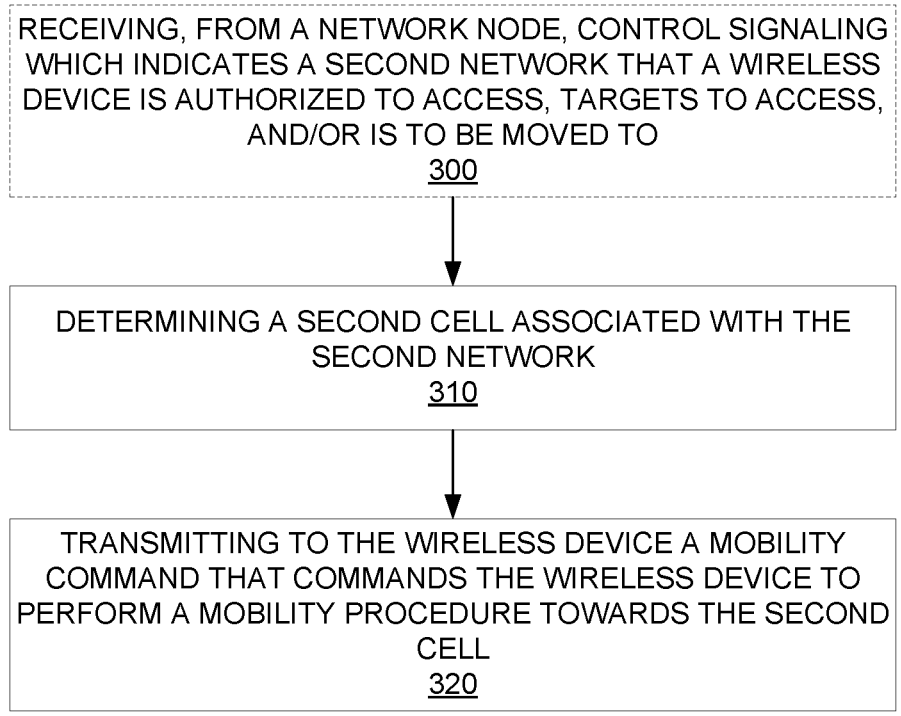
FIG. 3 is a logic flow diagram of a method performed by a radio network node according to some embodiments.

FIG. 3 depicts a method performed by a radio network node 26 configured to serve a first cell 14 associated with a first network in accordance with other particular embodiments. The method may include receiving, from a network node 24, control signaling 28 which indicates a second network that a wireless device 12 is authorized to access, targets to access, and/or is to be moved to (Block 300).

In some embodiments, the control signaling 28 indicates the second network by indicating a public land mobile network, PLMN, identity associated with the second network. In other embodiments, such as where the second network is an SNPN, the control signaling 28 may indicate the second network by indicating a public land mobile network identity, PLMN ID, and a network identifier, NID associated with the second network. In still other embodiments, such as where the second network is a PNiNPN, the control signaling 28 may indicate the second network by indicating a closed access group, CAG, identifier, or a network slice identifier, associated with the second network.

In some embodiments, the control signaling 28 is secured NAS signaling. Alternatively or additionally, the network node 24 in some embodiments is a core network node, such as a network node that implements an Access and Mobility Function, AMF.

Regardless, the method may further include determining a second cell 16 associated with the second network (Block 310). The method in some embodiments then includes transmitting to the wireless device 12 a mobility command 32 that commands the wireless device 12 to perform a mobility procedure towards the second cell 16 (Block 320). In some embodiments, the mobility procedure is a handover procedure or a redirect procedure.

In some embodiments, the first network is a public network. Alternatively or additionally, the second network may be a non-public network. For example, the second network may be a standalone non-public network (SNPN) or a public network integrated non-public network (PNiNPN).

In some embodiments, the second cell 16 conceals from the wireless device 12 an association of the second cell 16 with the second network. Alternatively or additionally, the second cell 16 refrains from transmitting information to the wireless device 12 indicating the second cell 16 is associated with the second network.

In some embodiments, the control signaling 18 further indicates information governing prioritization of one or more cells of the second network. For example, the information governing prioritization of one or more cells of the non-public network may include a radio access technology, RAT, selection priority information or frequency selection priority information.

Figure 4:
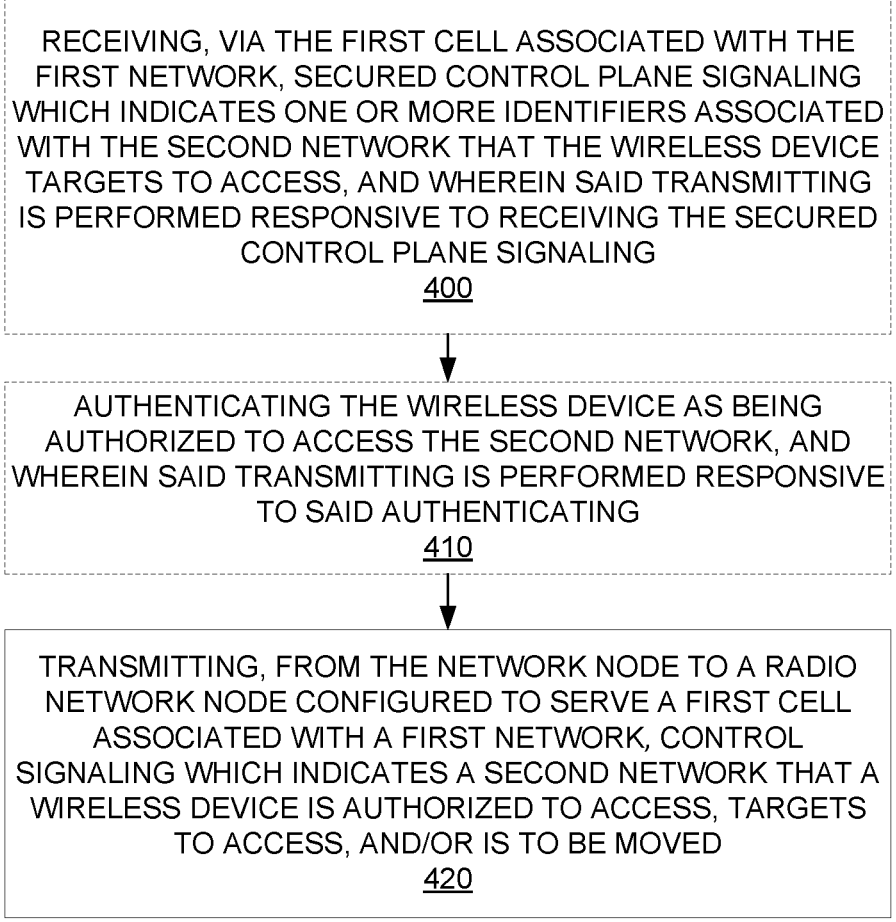
FIG. 4 is a logic flow diagram of a method performed by a network node according to some embodiments.

FIG. 4 depicts a method performed by network node 24, e.g., a core network node, such as a network node that implements an Access and Mobility Function (AMF). The method may include transmitting, from the network node 24 to a radio network node 26 configured to serve a first cell 14 associated with a first network, control signaling 28 which indicates a second network that a wireless device 12 is authorized to access, targets to access, and/or is to be moved (Block 420). In some embodiments, the control signaling is secured NAS signaling.

In some embodiments, the control signaling 28 indicates the second network by indicating a public land mobile network, PLMN, identity associated with the second network. In other embodiments, such as where the second network is an SNPN, the control signaling 28 may indicate the second network by indicating a public land mobile network identity, PLMN ID, and a network identifier, NID associated with the second network. In still other embodiments, such as where the second network is a PNiNPN, the control signaling 28 may indicate the second network by indicating a closed access group, CAG, identifier, or a network slice identifier, associated with the second network.

In some embodiments, one or more cells associated with the second network conceal from the wireless device 12 an association with the second network. Alternatively or additionally in some embodiments, one or more cells associated with the second network refrain from transmitting information to the wireless device indicating the one or more cells are associated with the second network.

In some embodiments, the first network is a public network. Alternatively or additionally, the second network may be a non-public network. For example, the second network may be a standalone non-public network (SNPN) or a public network integrated non-public network (PNiNPN).

In some embodiments, the method also includes receiving, via the first cell 14 associated with the first network, secured control plane signaling 34 which indicates one or more identifiers 36 associated with the second network that the wireless device 12 targets to access (Block 400). In this case, said transmitting is performed responsive to receiving the secured control plane signaling.

In some embodiments, the method also includes authenticating the wireless device as being authorized to access the second network (Block 410). In this case, said transmitting is performed responsive to said authenticating.

In some embodiments, the control signaling 18 further indicates information governing prioritization of one or more cells of the second network. For example, the information governing prioritization of one or more cells of the non-public network may include a radio access technology, RAT, selection priority information or frequency selection priority information.

Although not shown, other embodiments herein include a method performed by a wireless device. The method comprises transmitting, via a first cell associated with a first network, secured non-access stratum, NAS, signaling which indicates one or more identifiers associated with a second network that the wireless device targets to access. The method also comprises, after transmitting the secured NAS signaling, receiving from the first cell a mobility command that commands the wireless device to perform a mobility procedure towards a second cell that is associated with the second network.

Although not shown, other embodiments herein include a method performed by a wireless device. The method comprises determining whether or not the wireless device is in a coverage area of a cell associated with a non-public network. The method also comprises, responsive to determining that the wireless device is in a coverage area of a cell associated with a non-public network, transmitting secured non-access stratum, NAS, signaling which indicates one or more identifiers associated with the non-public network.

Although not shown, other embodiments herein also include a method performed by a radio network node in a radio access network of a public network. The method comprises forwarding, from a wireless device to a network node, secured non-access stratum, NAS, signaling which indicates a network slice identifier that identifies a network slice to which the wireless device targets access in a non-public network. The method also comprises transmitting, to the network node, one or more closed access group identifiers of cells available in the non-public network. In some embodiments, the one or more closed access group identifiers are transmitted to the network node in a Next Generation Application Protocol, NGAP, message. Alternatively or additionally, the network node may implement an access and mobility function, AMF.

Although not shown, other embodiments herein include a method performed by a network node. The method comprises transmitting, to a radio network node in a radio access network of a public network, control signaling which indicates information governing prioritization of one or more cells of the non-public network. In some embodiments, the information governing prioritization of one or more cells of the non-public network includes a radio access technology, RAT, selection priority information or frequency selection priority information.

Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 26 configured to perform any of the steps of any of the embodiments described above for the radio network node 26.

Embodiments also include a radio network node 26 comprising processing circuitry and power supply circuitry. The processing circuitry is configured to perform any of the steps of any of the embodiments described above for the radio network node 26. The power supply circuitry is configured to supply power to the radio network node 26.

Embodiments further include a radio network node 26 comprising processing circuitry. The processing circuitry is configured to perform any of the steps of any of the embodiments described above for the radio network node 26. In some embodiments, the radio network node 26 further comprises communication circuitry.

Embodiments further include a radio network node 26 comprising processing circuitry and memory. The memory contains instructions executable by the processing circuitry whereby the radio network node 26 is configured to perform any of the steps of any of the embodiments described above for the radio network node 26.

Embodiments herein also include a radio network node 26 configured to perform any of the steps of any of the embodiments described above for the radio network node 26.

Embodiments also include a radio network node 26 comprising processing circuitry and power supply circuitry. The processing circuitry is configured to perform any of the steps of any of the embodiments described above for the radio network node 26. The power supply circuitry is configured to supply power to the radio network node 26.

Embodiments further include a radio network node 26 comprising processing circuitry. The processing circuitry is configured to perform any of the steps of any of the embodiments described above for the radio network node 26. In some embodiments, the radio network node 26 further comprises communication circuitry.

Embodiments further include a radio network node 26 comprising processing circuitry and memory. The memory contains instructions executable by the processing circuitry whereby the radio network node 26 is configured to perform any of the steps of any of the embodiments described above for the radio network node 26.

Embodiments herein also include a network node 24 configured to perform any of the steps of any of the embodiments described above for the network node 24.

Embodiments also include a network node 24 comprising processing circuitry and power supply circuitry. The processing circuitry is configured to perform any of the steps of any of the embodiments described above for the network node 24. The power supply circuitry is configured to supply power to the network node 24.

Embodiments further include a network node 24 comprising processing circuitry. The processing circuitry is configured to perform any of the steps of any of the embodiments described above for the network node 24. In some embodiments, the network node 24 further comprises communication circuitry.

Embodiments further include a network node 24 comprising processing circuitry and memory. The memory contains instructions executable by the processing circuitry whereby the network node 24 is configured to perform any of the steps of any of the embodiments described above for the network node 24.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
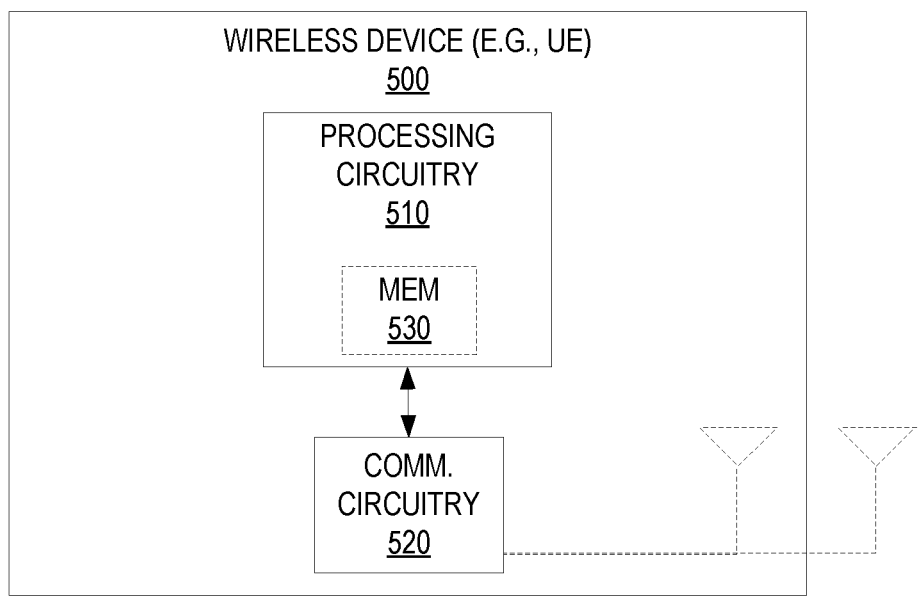
FIG. 5 is a block diagram of a wireless device according to some embodiments.

FIG. 5 for example illustrates a wireless device 500 (e.g., wireless device 12) as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, e.g., in FIG. 2, such as by executing instructions stored in memory 530. The processing circuitry 510 in this regard may implement certain functional means, units, or modules.

Figure 6:
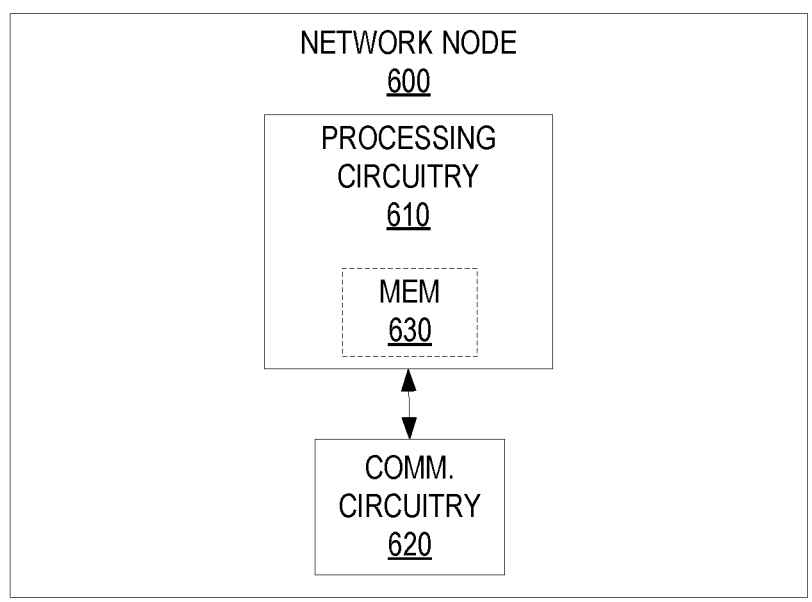
FIG. 6 is a block diagram of a network node according to some embodiments.

FIG. 6 illustrates a network node 600 (e.g., radio network node 26 or network node 24) as implemented in accordance with one or more embodiments. As shown, the network node 600 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments herein are applicable in the context of a 5G system. The 5G System includes many features that require the introduction of new security mechanisms as compared to prior generation systems. For example, the 5G System integrates non-3GPP access (e.g. wireless local area network, WLAN) alongside 3GPP access (New Radio and Long Term Evolution, LTE) in a seamless manner. More precisely, in 5G, the user equipment (UE) can run the usual service access procedure independently of the underlying access.

Figure 7:
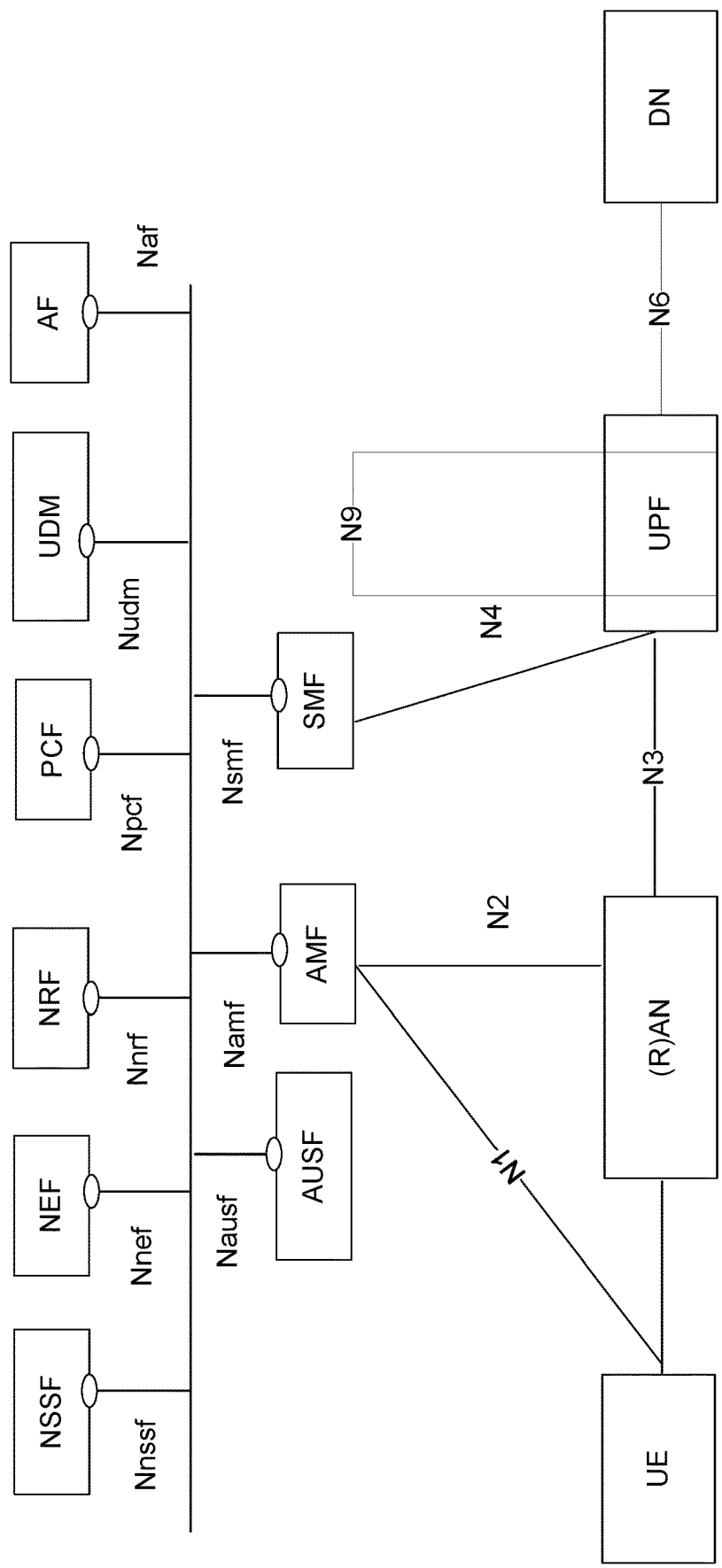
FIG. 7 is a block diagram of a 5G system according to some embodiments.

The 5G System consists of the Access network (AN) and the Core Network (CN). The AN is the network that allows the UE to gain connectivity to the CN, e.g. the base station which could be a gNB or an ng-eNB in 5G. The CN contains all the Network Functions (NF) ensuring a wide range of different functionalities such as session management, connection management, charging, authentication, etc. FIG. 7 from 3GPP Technical Specification (TS) 23.501 v16.2.0 gives a high overview of the 5G architecture for the non-roaming scenario.

The communication links between the UE and the network (AN and CN) can be grouped in two different strata. The UE communicates with the CN over the Non-Access Stratum (NAS), and with the AN over the Access Stratum (AS). All the NAS communication takes place between the UE and the Access and connectivity Management Function (AMF) in the CN over the NAS protocol (N1 interface in FIG. 7). Protection of the communications over these strata is provided by the NAS protocol (for NAS) and the Packet Data Convergence Protocol (PDCP) (for AS).

More details on the 5G security can be found in TS 33.501 v16.0.0, but in general, the security mechanisms for these protocols rely on multiple different security keys. In the 5G security specification, these keys are organized in a hierarchy. At the top level there is the long-term key part of the authentication credential and stored in the Subscriber Identification Module (SIM) card on the UE side and in the Unified Data Management (UDM)/Authentication credential Repository and Processing Function (ARPF) on the Home Public Land Mobile Network (PLMN) side.

A successful Primary Authentication run between the UE and the Authentication Function (AUSF) in the Home PLMN leads to the establishment of the $K_{AUSF}$ key which is the second level key in the hierarchy. This key is not intended to leave the Home PLMN and is used for new features introduced in the 5G System, such as for the provisioning of parameters to the UE from the Home PLMN. More precisely, the $K_{AUSF}$ key is used for the integrity protection of the messages delivered from the Home PLMN to the UE. As described in TS 33.501 v16.0.0, such new features include the Steering of Roaming (SoR) and the UDM parameter delivery procedures.

The $K_{AUSF}$ is in used to derive another key that is sent to the serving PLMN ($K_{SEAF}$). This serving PLMN key (also referred to as an anchor key) is then used to derive the subsequent NAS and AS protection keys. These lower level keys together with other security parameters such as the cryptographic algorithms, the UE security capabilities, the value of the counters used for replay protection in the different protocols, etc., constitute what is defined as the 5G security context in TS 33.501 v16.0.0. It should be noted that $K_{AUSF}$ is not part of the 5G security context since 5G security context resides in the serving network.

Release 16 will deliver several new features to the 5G System. One of these features is the support for the so-called Non-Public Network (NPN) as described in TS 23.501 v16.2.0. This feature is intended to help verticals make use of the 5G System services by either deploying their own standalone 5G System, a concept denoted by standalone Non-Public Network (SNPN) or via a PLMN, called Public Network integrated NPN (PNiNPN) NPN. One example context is a factory owner who wants to deploy his or her own 5G System to provide connectivity to the machines and employees.

The concept of Closed Access Group (CAG) enables the deployment of PNiNPN. A CAG can be thought of as a group of subscribers who are authorized to access and receive services from a PNiNPN. Within a PLMN, each CAG has a unique identifier (CAG ID). Heretofore, this CAG ID is included in the System Information (SI) and broadcasted by the RAN nodes. A UE transitioning from idle to connected state performs the automatic cell selection procedure while considering the broadcasted CAG ID, if any. This will prevent UEs that are not authorized to access a given PNiNPN from automatically selecting the associated cells.

Some embodiments herein address certain challenge(s) concerning CAG ID Privacy, e.g., as captured in clause 5.6.2 of TR 33.819 v1.2.0. There are two privacy issues, one related to the UE and one related to the network. For the UE privacy issue, according to known approaches for PNiNPN authorization, the UE includes the CAG ID it wants to access in the clear (i.e., not encrypted) at the AS layer during the Registration procedure. This proves vulnerable to the threat that an adversary may be able to eavesdrop on the UE Registration Procedure and learn the transmitted in-the-clear matched CAG ID. If the adversary is aware of sensitive CAGs (e.g., dedicated to Law Enforcement Agency (LEA)) they can infer the presence of members of such CAG (e.g., LEA)". For the network side, the NG-RAN broadcasting its list of CAG IDs allows an eavesdropper to positively identify an NG-RAN cell as a specific cell (e.g., serving a particular, sometimes small, set of Critical Infrastructure UEs).

For the UE privacy issue, one possible solution that mitigates the issue is that the UE does not send the CAG ID in-the-clear at the AS layer in the first place. Since this CAG ID is needed for authorization purposes by the AMF in the core network, it can as well be sent after authentication and NAS security establishment at the NAS layer. In such case, the CAG ID would be protected by the NAS security.

For the network issue, there are two solutions in clause 6.11 and 6.12 of TR 33.819 v1.2.0. Both solutions assume that the UE sends the CAG ID to the RAN node on the AS layer in an encrypted form. The solutions also require the RAN node to perform some additional steps in order to determine the CAG ID sent by the UE. While the solutions resolve both the UE and the network side privacy issues, they require additional steps from the network side, here the RAN node, to resolve the CAG ID sent by the UE. In addition, they entirely rely on the assumption that the UE sends the CAG ID to the RAN node, on the AS layer, in the first place.

Furthermore, the domain parameters used for example in the solution of clause 6.11, based on elliptic curve cryptography, would be known to a large group of entities, RAN nodes and UEs. In fact, those parameters are supposed to be public, so an attacker getting hold of such parameter can impersonate a RAN node and guess his way through to which CAG ID the UE wants to access. An attacker in possession of such parameters can also easily recover which CAG ID a RAN node supports. The solution in clause 6.12, based on the use of hash function, is also subject to the same attack since an attacker can impersonate a RAN node and by hashing several possible values of CAG IDs can guess his way through to get the UE to send the CAG ID it wants to access.

Similarly to the privacy sensitive nature of the CAG, the PLMN ID (and PLMN ID and NID) can be seen as privacy sensitive.

Certain aspects of the present disclosure and their embodiments may provide solutions to these or other challenges. Some embodiments herein address the network side privacy issue by providing the means to conceal the association between the cells and the privacy sensitive NPN (e.g., PNiNPN) or PLMN. In one or more embodiments, for example, access to a dedicated cell (e.g., associated with an NPN) is provided by the means of a mobility mechanism upon which the UE is redirected (e.g., from an open cell) to a desired dedicated cell after authorization.

Certain embodiments may provide one or more of the following technical advantage(s): (i) some embodiments do not require additional steps to be undertaken by the RAN node in order to determine the CAG ID (or PLMN ID, or PLMN ID and NID) sent by the UE and thus has less computational overhead; (ii) some embodiments allow the UE to send the CAG ID (or PLMN ID, or PLMN ID and NID) on the NAS layer after authentication and thus rely on less signaling on the AS layer; and/or (iii) some embodiments conceal the association between cells and the associated NPN (e.g., PNiNPN) or PLMN from an eavesdropper on the air interface. Some embodiments, for example, conceal the association between a CAG ID and the corresponding NPN from an eavesdropper on the air interface and make it only available to UEs authorized to access the NPN in question.

Figure 8:
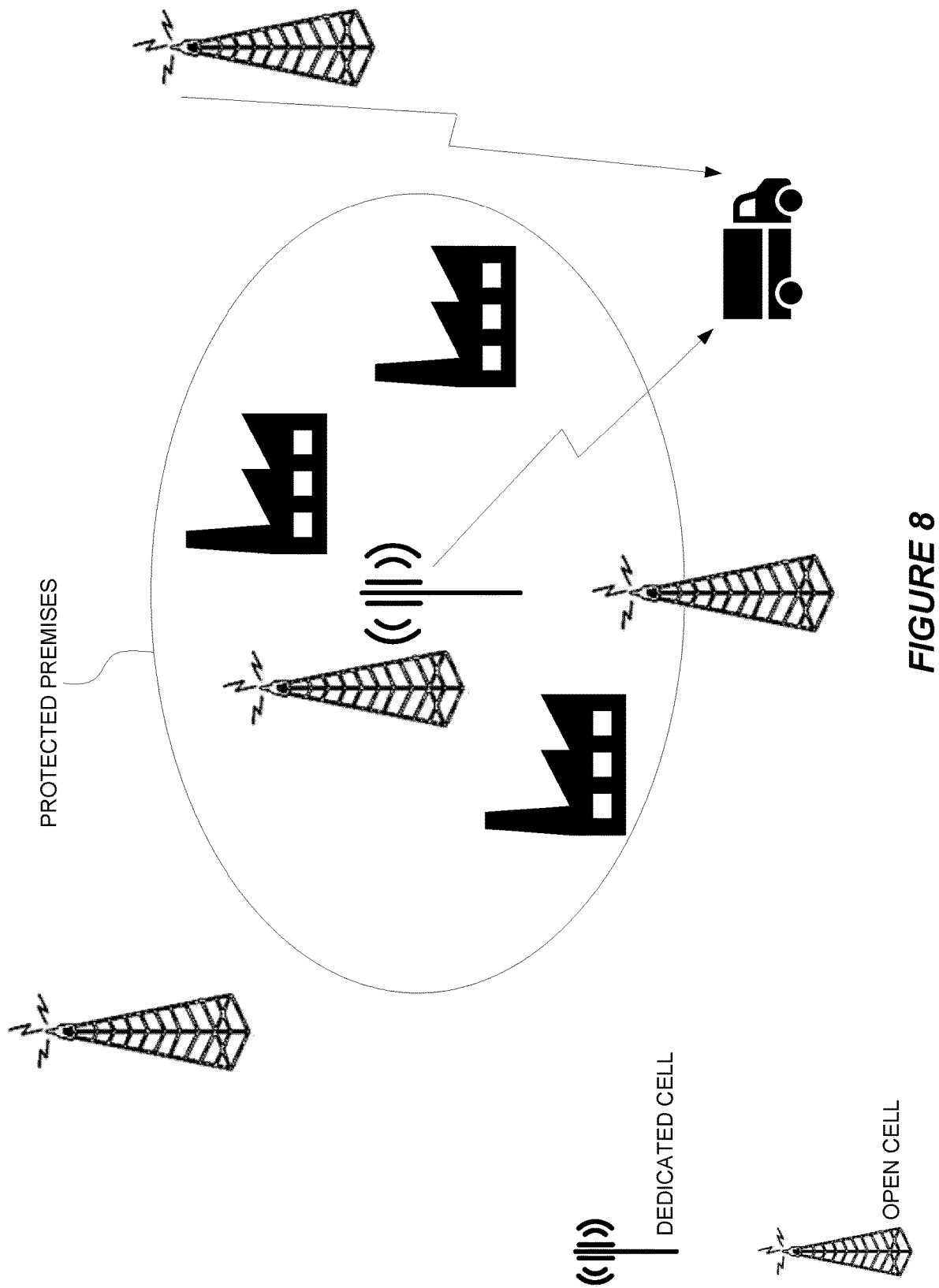
FIG. 8 is a block diagram of a deployment of cells according to some embodiments.

More particularly, some embodiments exploit a scenario where access to a privacy sensitive NPN is provided via dedicated cells (i.e., CAG cells) whose coverage overlaps with one or more open cells associated with a public network. Here, a dedicated cell is a cell dedicated to a certain network, e.g., NPN. The open cell could be a default cell or even a CAG cell but associated with less privacy sensitive PNiNPN. FIG. 8 shows an example deployment of the cells such that some of them are open while some are dedicated with a PNiNPN for a factory owner whose premises are shown as protected.

According to some embodiments, the UE is instructed to move to a dedicated cell (e.g., associated with a PNiNPN) via a handover procedure or a re-direction procedure after being authorized by the network to access the PNiNPN in question.

In some embodiments, at the authorization phase, a UE that needs to access the privacy sensitive PNiNPN uses any cell for access and indicates the associated CAG ID. In case the UE is authorized, then the network instructs the UE to move to the dedicated cell, should the UE be accessing the network via a different non-dedicated cell.

It should be noted that a dedicated cell and open cell can in reality be sharing the same RAN and even be the same cell. In this case, for "open cell" access, the cell broadcasts System Information to inform a UE that the cell can be used to access the network without the UE having to provide some information at AS layer (RRC) (e.g., CAG ID). And, for "dedicated cell" access, the same cell may broadcast System Information e.g. for the PNiNPN and possibly other PNiNPNs or PLMNs or PLMNs and NIDs.

Figure 9:
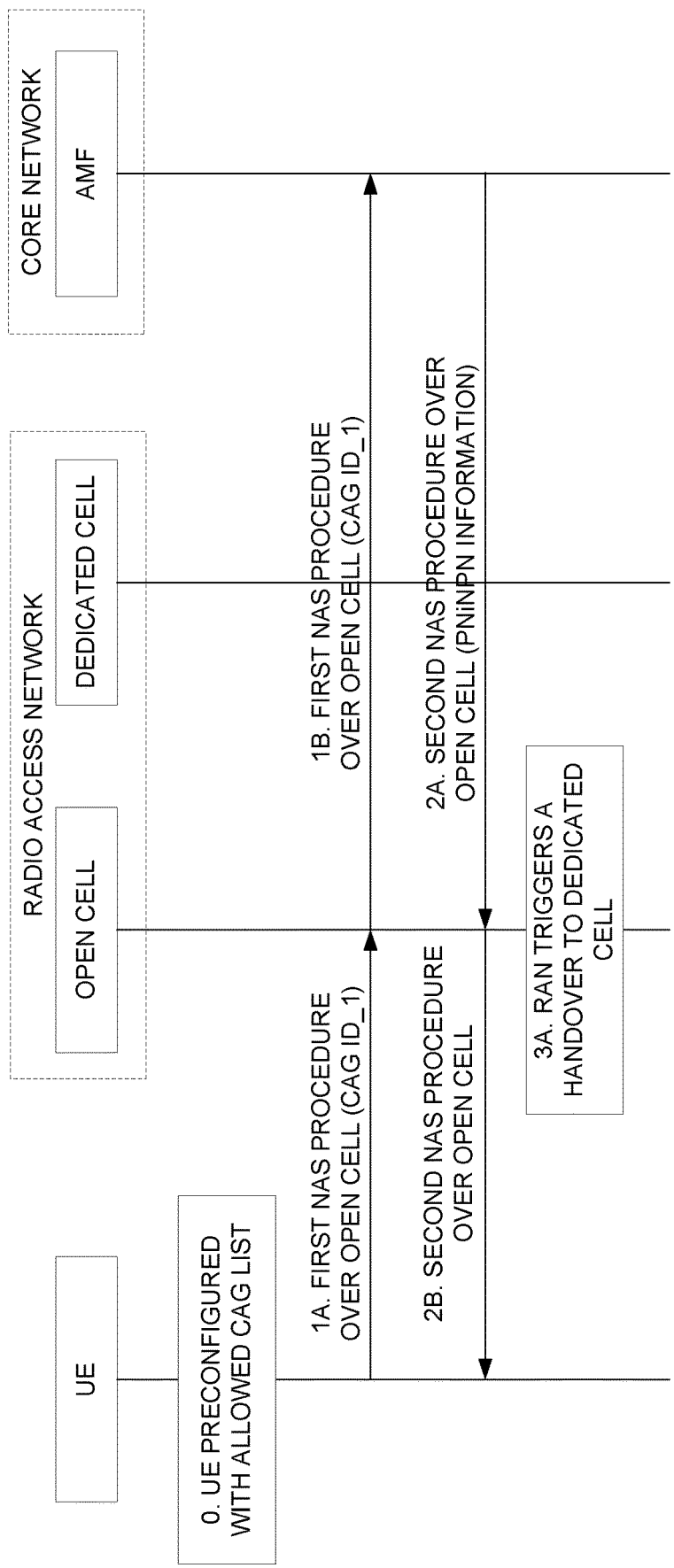
FIG. 9 is a call flow diagram between a wireless device, a RAN, and a core network according to some embodiments.

FIG. 9 illustrates the steps undertaken by the network and the device in order to realize this feature in an embodiment where the association between the CAG ID and the corresponding dedicated cells is resolved in the RAN. In this example, then, the first network in FIG. 1 is a public network and the second network in FIG. 1 is an NPN.

Step 0. It is assumed that the UE has been pre-configured by the necessary parameters such as the list of allowed CAG IDs as described in 23.501 v16.2.0 clause 5.30.3. This could have been realized by an out-of-band mechanism or earlier via a run of the UE Configuration Update procedure.

PLMN ID option: PLMN ID or PLMN ID and NID is assumed to be pre-configured.

Step 1. The UE happens to access the network using an open cell which is not dedicated to the target PNiNPN and indicates to the network that it wants to access a given CAG ID (say ID_1). This is shown in FIG. 9 step 1A and 1B as a first NAS procedure over the open cell, e.g., as an example of a first NAS procedure performed in step 200 of FIG. 2. This can be potentially done via a registration procedure over the NAS protocol after authentication and security establishment as shown in FIG. 9. The goal here is to make sure that the network is aware one way or the other that this UE wants to access the PNiNPN associated with the CAG ID ID_1. In deployment scenarios where this UE is only for accessing this particular PNiNPN (e.g., a factory robot), then this information can be for example included in the subscription information and retrieved from the UDM. In such a case, the UE does not need to send the CAG ID in the first place.

As an alternative to the UE providing the CAG ID, the UE provides other existing information e.g. Requested Network Slice Selection Assistance Information (NSSAI) and instead the NG-RAN provides the CAG IDs of the available cells in an Next Generation Application Protocol (NGAP) message to AMF (e.g. at the same time as forwarding the NAS message from the UE). The AMF uses the provided list of CAG IDs and the Allowed CAG list from the subscription to derive which CAG IDs are available and allowed to be accessed by the UE. The AMF may in addition use e.g. the Requested NSSAI and resulting Allowed NSSAI to further derive the list of CAG IDs and set the radio access technology (RAT)/Frequency Selection Priority (RFSP) information or Service Profile ID (SPID) accordingly.

PLMN ID option: 1a) UE provides PLMN ID (or PLMN ID and NID) in a secured NAS message e.g. Registration message or SMC complete message. 1b) RAN routes the UE request to an AMF configured to act as a default AMF for selecting a network.

Step 2. After a successful authorization, the network sends to the RAN the necessary information to indicate that the UE is targeting to access a particular PNiNPN so that the UE can access the network using the cells associated with the PNiNPN identified by CAG ID ID_1. This information can be the CAG ID ID_1 provided by the UE in step 1 (or the resulting list of CAG IDs after comparing the NG-RAN provided list of available CAG IDs and the UE's Allowed CAG list). Step 2 then may be an example implementation of Block 420 in FIG. 4. Regardless, in some embodiments, the information sent to the NG-RAN may further include information to prioritize the dedicated cell(s), e.g., set as part of the RAT/Frequency Selection Priority (RFSP) parameter described in clause 5.3.4.3 of TS 23.501.

PLMN ID option: Not shown, but the default AMF selects a Target AMF serving the PLMN ID (or PLMN and NID) provided by the UE and reroutes the UE request to the Target AMF using existing reroute/re-allocation of AMF procedures. The Target AMF then 2a) replies to the RAN with information (i.e. selected PLMN ID or PLMN ID and NID and other information e.g. RFSP/SPID etc) enabling the RAN to select dedicated cells for the UE. The Target AMF also 2b) replies to the UE accepting the UE to the network.

Step 3. The RAN uses the received information to determine the cells associated to the PNiNPN identified by the information provided in step 2 and triggers a handover procedure in order to move the UE to a dedicated cell. This Step 3 may therefore exemplify Blocks 310 and 320 in FIG. 3, as well as step 210 in FIG. 2 where the mobility procedure is a handover procedure.

PLMN ID option: Same as for PNiNPN but RAN determines the cells associated with the PLMN ID or PLMN ID and NID.

Figure 10:
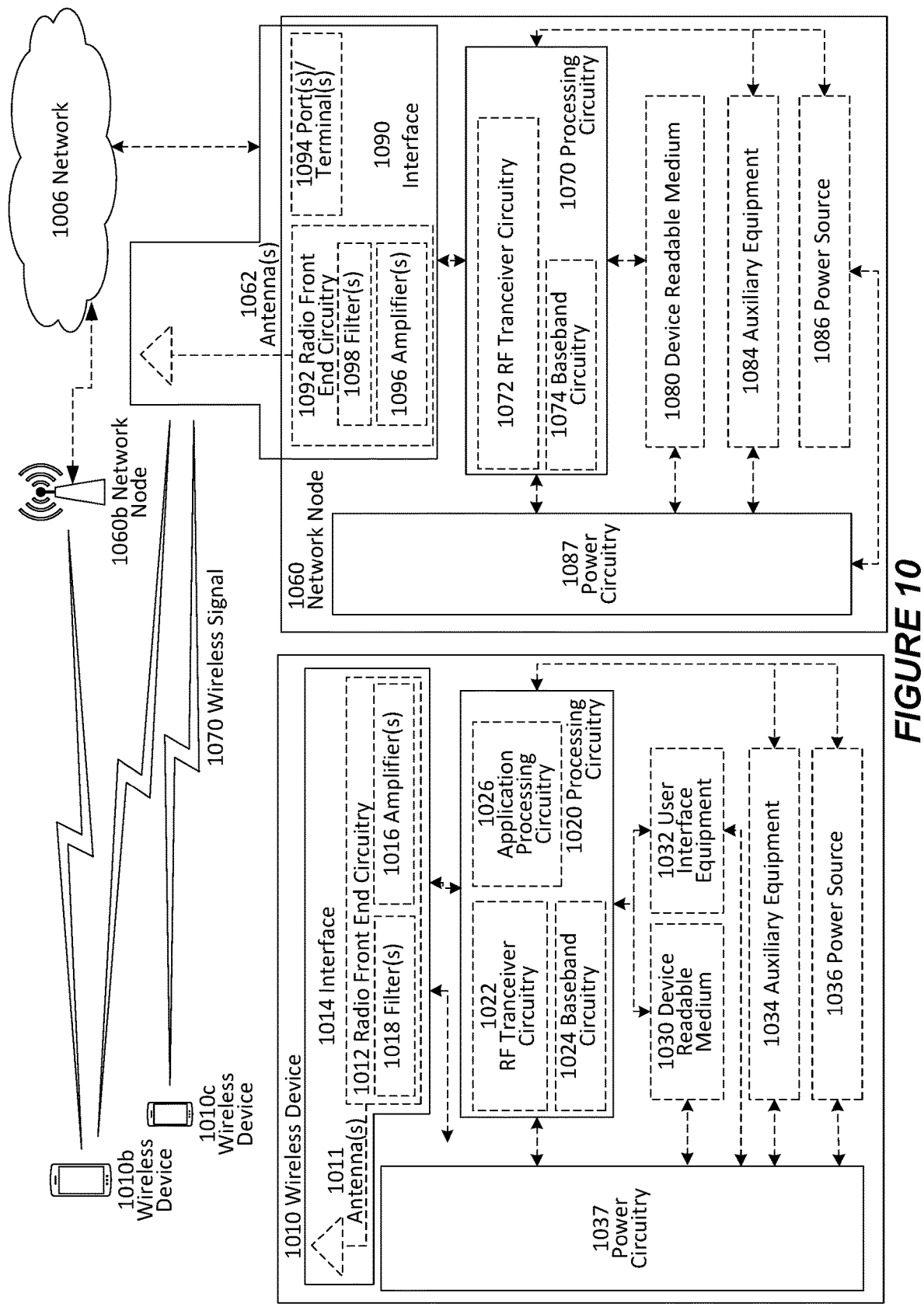
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060*b*, and WDs 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
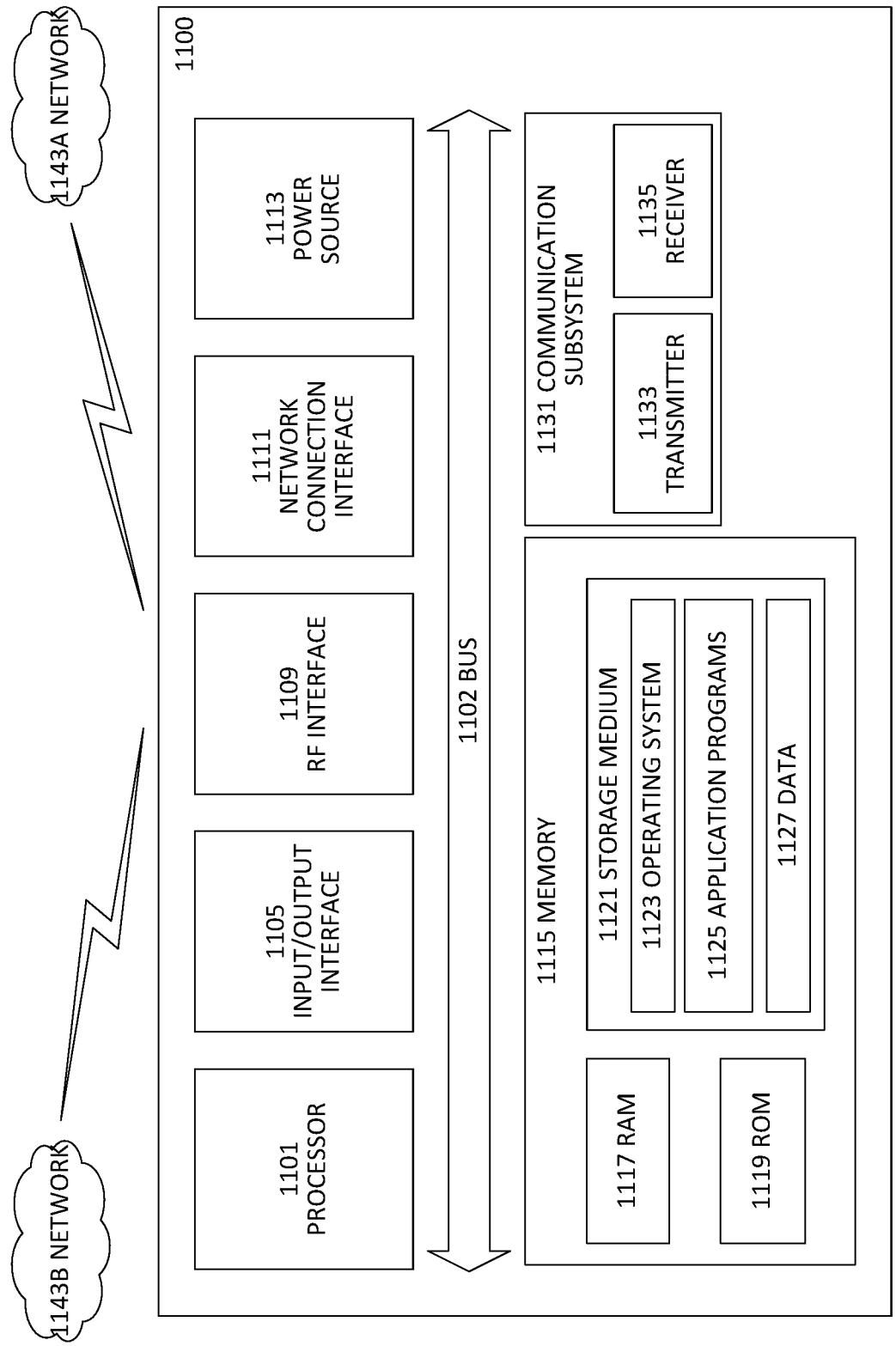
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
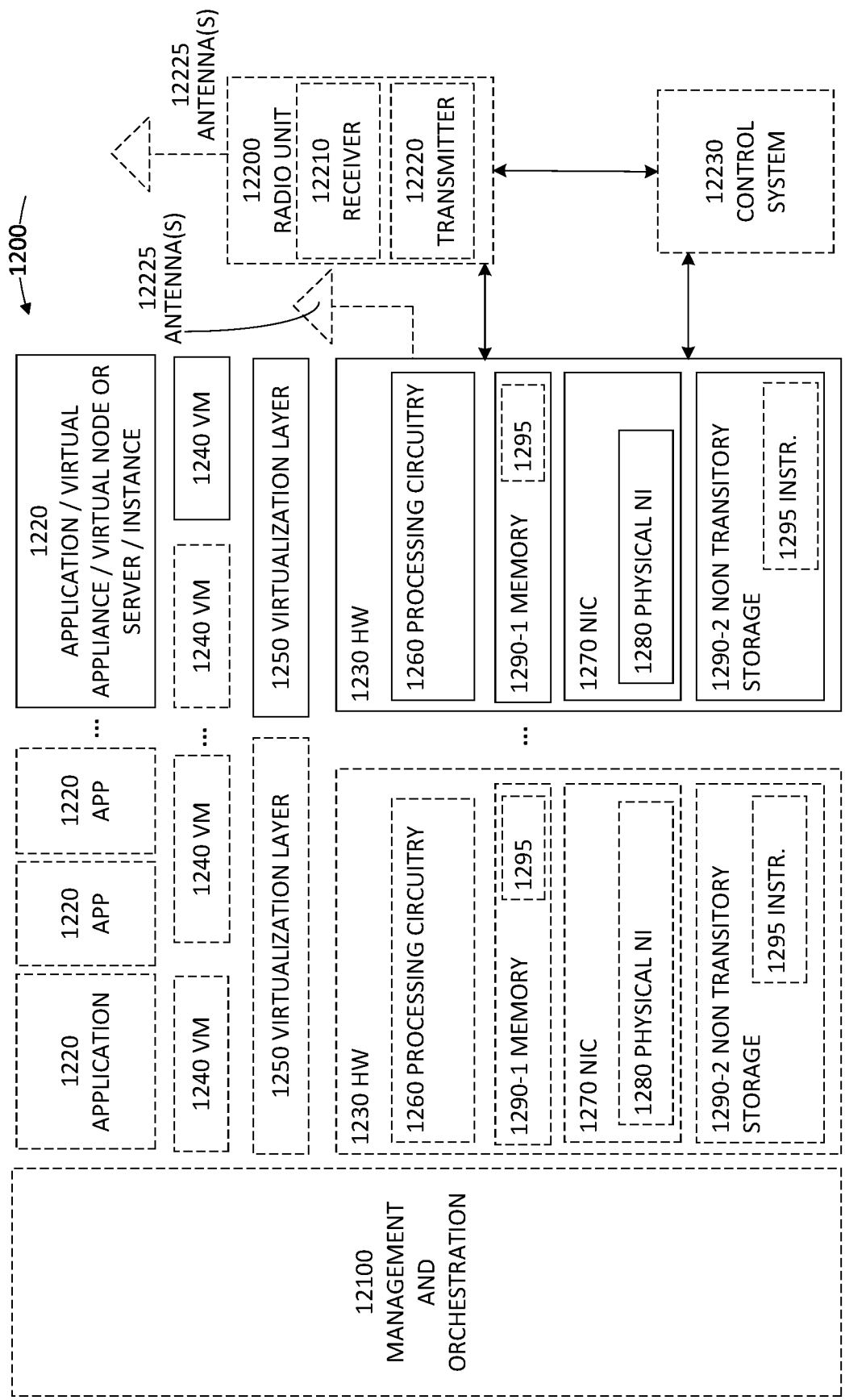
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
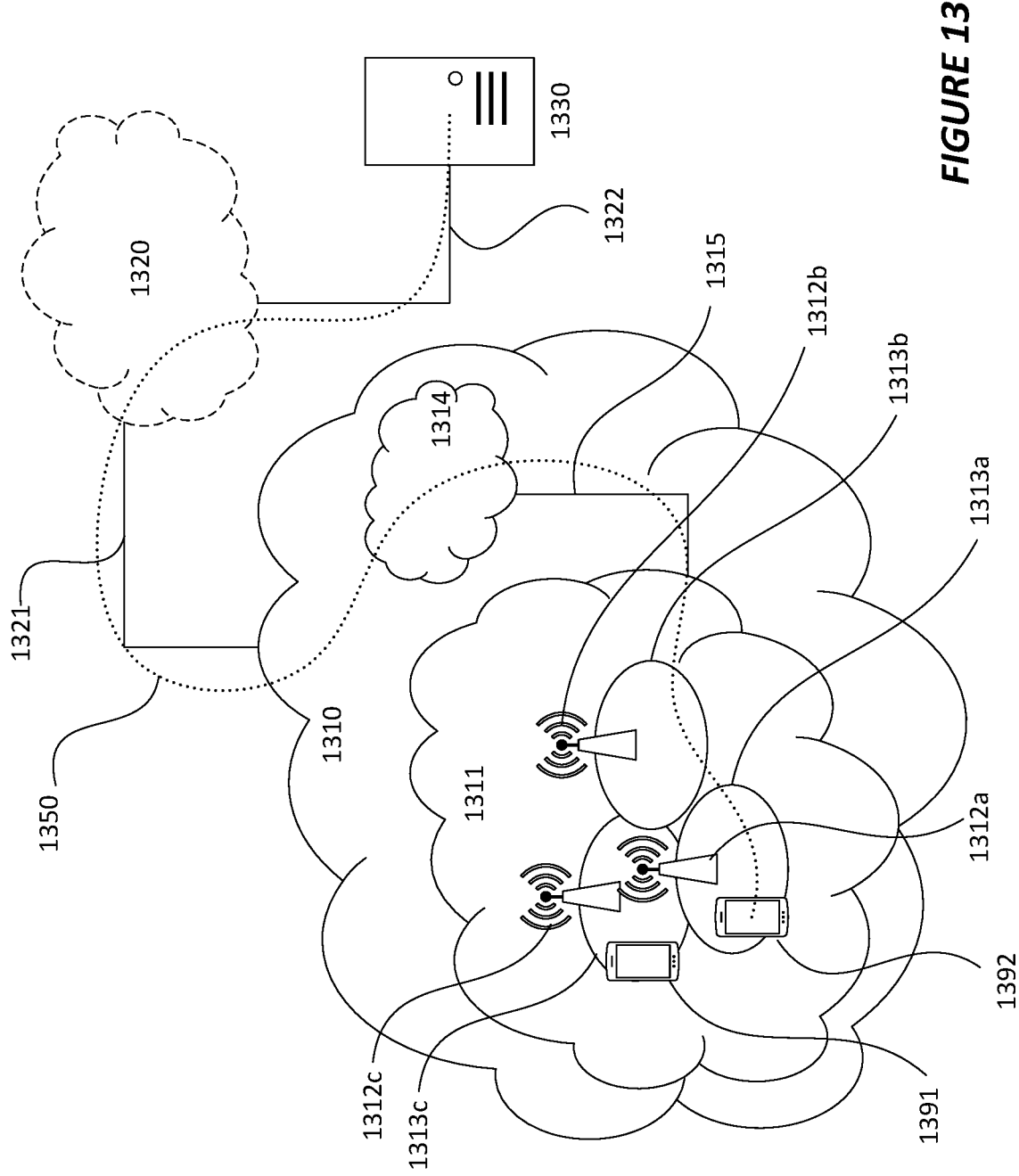
FIG. 13 is a block diagram of a communication network with a host computer according to some embodiments.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
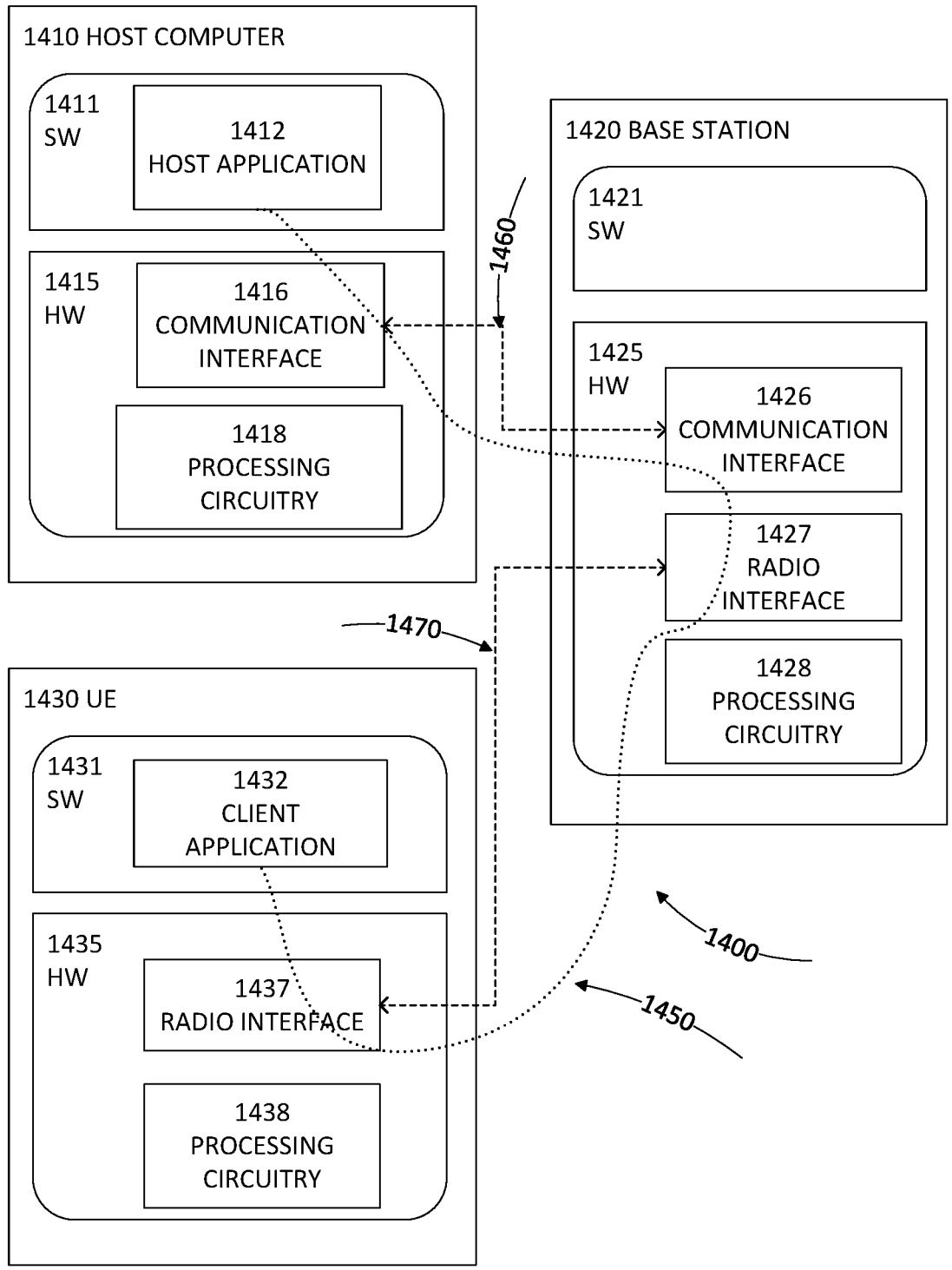
FIG. 14 is a block diagram of a host computer according to some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or nonhuman user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
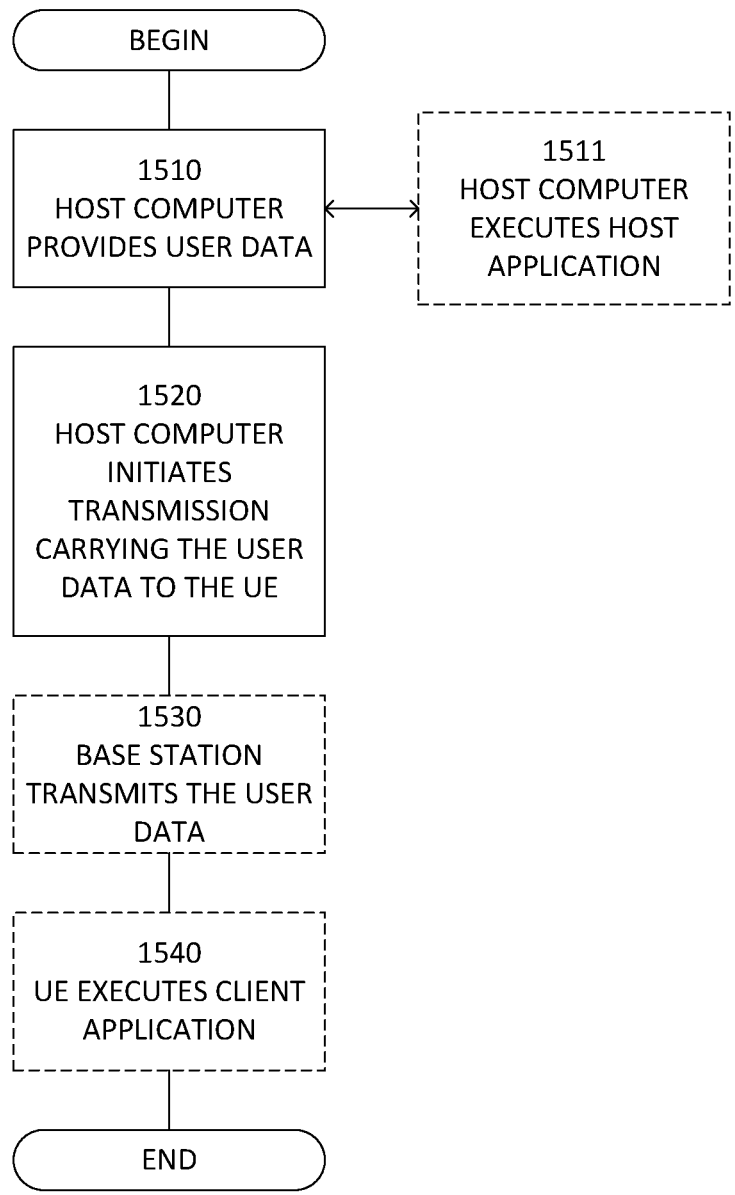
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
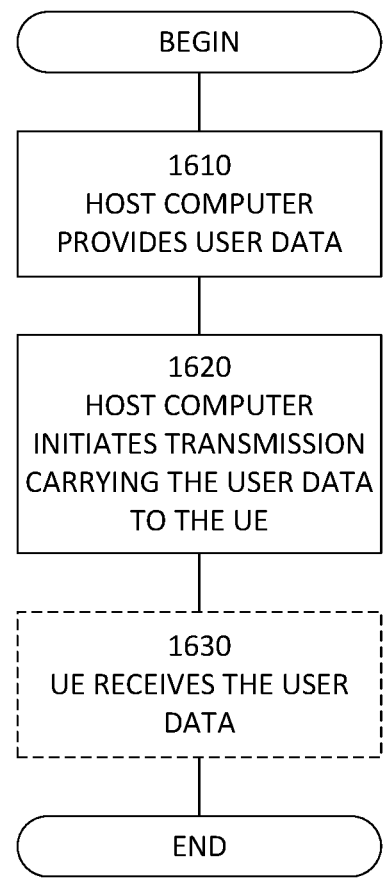
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
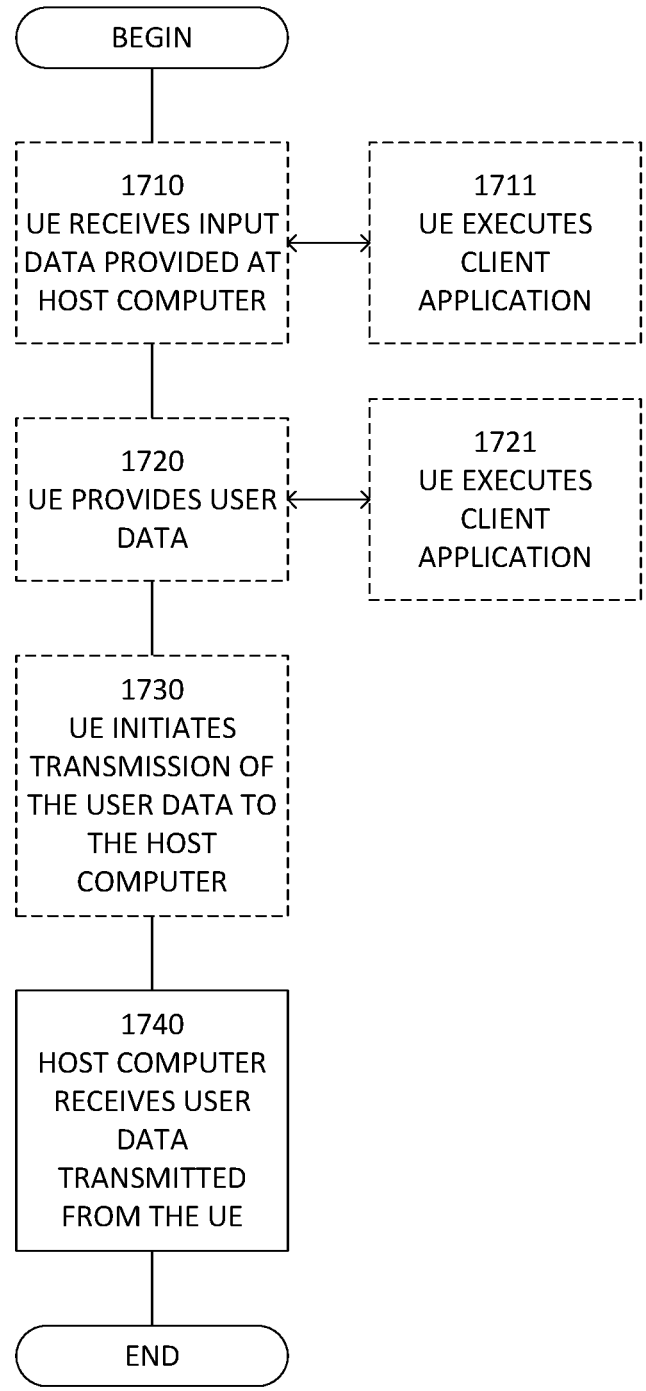
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
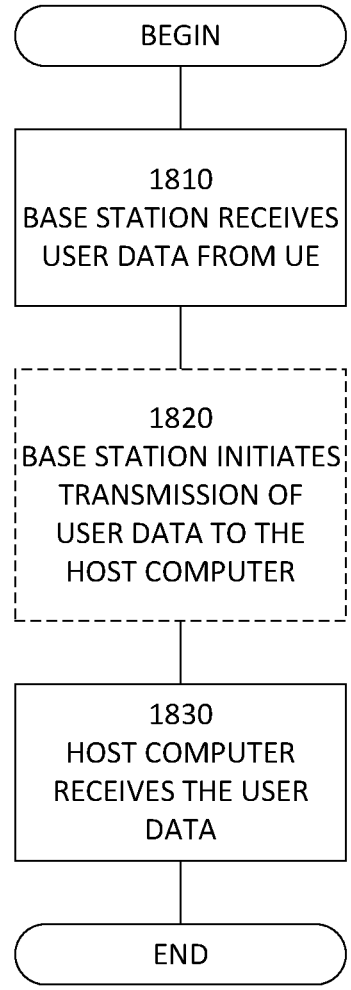
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    performing, over a first cell associated with a public network, a non-access stratum (NAS) procedure in which the wireless device is authenticated as being authorized to access a non-public network;
    transmitting, via the first cell, secured NAS signaling which indicates one or more identifiers associated with the non-public network that the wireless device targets to access, wherein either:
        the non-public network is a standalone non-public network (SNPN), and the one or more identifiers include a public land mobile network identity (PLMN ID) and a network identifier (NID); or
        the non-public network is a public network integrated non-public network (PNINPN), and the one or more identifiers include a public land mobile network identity (PLMN ID); and
    after performing the NAS procedure, receiving from the first cell a mobility command that commands the wireless device to perform a mobility procedure towards a second cell associated with the non-public network, wherein the mobility command is received responsive to transmitting the secured NAS signaling.

2. The method of claim 1, wherein the mobility procedure is a handover procedure or a redirect procedure.

3. The method of claim 1, further comprising performing the mobility procedure towards the second cell.

4. The method of claim 1, wherein the mobility command includes an identifier of the second cell towards which the wireless device is to perform the mobility procedure, and wherein the method further comprises determining, based on the mobility command, that the second cell identified by the identifier is a cell associated with the non-public network.

5. The method of claim 1, wherein the secured NAS signaling comprises a Registration message or a Security Mode Command (SMC) Complete message.

6. The method of claim 1, wherein authentication of the wireless device as being authorized to access the non-public network is based on or triggered by the secured NAS signaling.

7. A method performed by a radio network node configured to serve a first cell associated with a public network, the method comprising:
    receiving, from a core network node, control signaling which indicates a non-public network that a wireless device is authorized to access, targets to access, and/or is to be moved to, wherein either:
        the non-public network is a standalone non-public network (SNPN), and the control signaling indicates the non-public network by indicating a public land mobile network identity (PLMN ID) and a network identifier (NID) associated with the non-public network; or
        the non-public network is a public network integrated non-public network PNINPN), and the control signaling indicates the non-public network by indicating a closed access group (CAG) identifier, or a network slice identifier, associated with the non-public network;
    determining a second cell associated with the non-public network; and transmitting, to the wireless device, a mobility command that commands the wireless device to perform a mobility procedure towards the second cell.

8. The method of claim 7, wherein the mobility procedure is a handover procedure or a redirect procedure.

9. The method of claim 7, wherein the control signaling further indicates information governing prioritization of one or more cells of the non-public network.

10. The method of claim 9, wherein the information governing prioritization of one or more cells of the non-public network includes a radio access technology (RAT) selection priority information or frequency selection priority information.

11. The method of claim 7, wherein the second cell conceals from the wireless device an association of the second cell with the non-public network, and wherein the first cell advertises to the wireless device that the first cell is associated with the public network.

12. A method performed by a core network node, the method comprising:
   authenticating a wireless device as being authorized to access a non-public network; and
   transmitting, from the core network node to a radio network node configured to serve a first cell associated with a public network, control signaling which indicates the non-public network that the wireless device is authorized to access, targets to access, and/or is to be moved to.

13. The method of claim 12, wherein said transmitting is performed responsive to said authenticating.

14. The method of claim 12, further comprising receiving, via the first cell associated with the public network, secured control plane signaling which indicates one or more identifiers associated with the non-public network that the wireless device targets to access, and wherein said transmitting is performed responsive to receiving the secured control plane signaling.

15. The method of claim 12, wherein either:
   the non-public network is a standalone non-public network (SNPN), and the control signaling indicates the non-public network by indicating a public land mobile network identity (PLMN ID) and a network identifier (NID) associated with the non-public network; or
   the non-public network is a public network integrated non-public network (PNiNPN), and the control signaling indicates the non-public network by indicating a closed access group (CAG) identifier, or a network slice identifier, associated with the non-public network.

16. The method of claim 12, wherein the control signaling further indicates information governing prioritization of one or more cells of the non-public network.

17. A method performed by a radio network node configured to serve a first cell associated with a public network, the method comprising:
   receiving, from a core network node, control signaling which indicates a non-public network that a wireless device is authorized to access, targets to access, and/or is to be moved to;
   determining a second cell associated with the non-public network, wherein the second cell conceals from the wireless device an association of the second cell with the non-public network, and wherein the first cell advertises to the wireless device that the first cell is associated with the public network; and
   transmitting, to the wireless device, a mobility command that commands the wireless device to perform a mobility procedure towards the second cell.

18. The method of claim 17, wherein the control signaling further indicates information governing prioritization of one or more cells of the non-public network.

19. The method of claim 18, wherein the information governing prioritization of one or more cells of the non-public network includes a radio access technology (RAT) selection priority information or frequency selection priority information.

* * * * *